United States Patent [19]

Yamashita et al.

[11] Patent Number: 5,659,375
[45] Date of Patent: Aug. 19, 1997

[54] ACTIVE MATRIX LCD DEVICE HAVING TWO EQUAL COUPLING CAPACITANCES

[75] Inventors: Toshihiro Yamashita; Masumi Kubo, both of Nara, Japan

[73] Assignee: Sharp Kabushiki Kaisha, Osaka, Japan

[21] Appl. No.: 459,523

[22] Filed: Jun. 2, 1995

[30] Foreign Application Priority Data

Jun. 15, 1994 [JP] Japan .................................. 6-132974
Apr. 28, 1995 [JP] Japan .................................. 7-106730

[51] Int. Cl.$^6$ .................... G02F 1/1343; G02F 1/1333
[52] U.S. Cl. ........................................... 349/38; 349/111
[58] Field of Search ............................ 359/59, 57, 67; 349/42, 44, 111, 38

[56] References Cited

U.S. PATENT DOCUMENTS

| | | | |
|---|---|---|---|
| 5,151,806 | 9/1992 | Kawamoto et al. | 359/59 |
| 5,182,620 | 1/1993 | Shimada et al. | 359/59 |
| 5,345,324 | 9/1994 | Koseki et al. | 359/67 |
| 5,394,258 | 2/1995 | Morin et al. | 359/57 |
| 5,426,523 | 6/1995 | Shimada et al. | 359/59 |
| 5,446,562 | 8/1995 | Sato | 359/59 |
| 5,453,857 | 9/1995 | Takahara | 359/57 |
| 5,459,595 | 10/1995 | Ishiguro et al. | 359/59 |
| 5,528,395 | 6/1996 | So | 359/67 |

FOREIGN PATENT DOCUMENTS

| | | | |
|---|---|---|---|
| 0 555 100 A1 | 8/1993 | European Pat. Off. | 359/59 |
| 58-172685 | 10/1983 | Japan . | |
| 63-301924 | 12/1988 | Japan . | |
| 4-74714 | 11/1992 | Japan . | |
| 5-43118 | 6/1993 | Japan . | |
| 6-230422 | 8/1994 | Japan . | |

Primary Examiner—Anita Pellman Gross
Assistant Examiner—Toan Ton
Attorney, Agent, or Firm—Nixon & Vanderhye P.C.

[57] ABSTRACT

A liquid crystal display panel of the invention includes an active matrix substrate. The active matrix substrate includes: a substrate; a plurality of pixel electrodes for driving a liquid crystal, the pixel electrodes being arranged in rows and columns on the substrate; a plurality of data signal lines for supplying data signals to pixel electrodes of a corresponding column; a plurality of switching devices for electrically connecting each data signal line to the pixel electrodes of the corresponding column; a plurality of scanning signal lines for controlling the switching devices to be conductive; and a plurality of storage capacitances respectively connected to terminals of the switching devices which are connected to the pixel electrodes. Each pixel electrode overlaps a corresponding data signal line with an insulating film interposed therebetween in a first region and overlaps an adjacent data signal line which is connected to pixel electrodes of a neighbor column with the insulating film interposed therebetween in a second region. A first coupling capacitance formed in the first region is substantially equal to a second coupling capacitance formed in the second overlap portion. The active matrix substrate receives the data signals in which polarities are inverted between fields or frames and the polarities are different between the corresponding one and the adjacent one of the data signal lines.

7 Claims, 9 Drawing Sheets

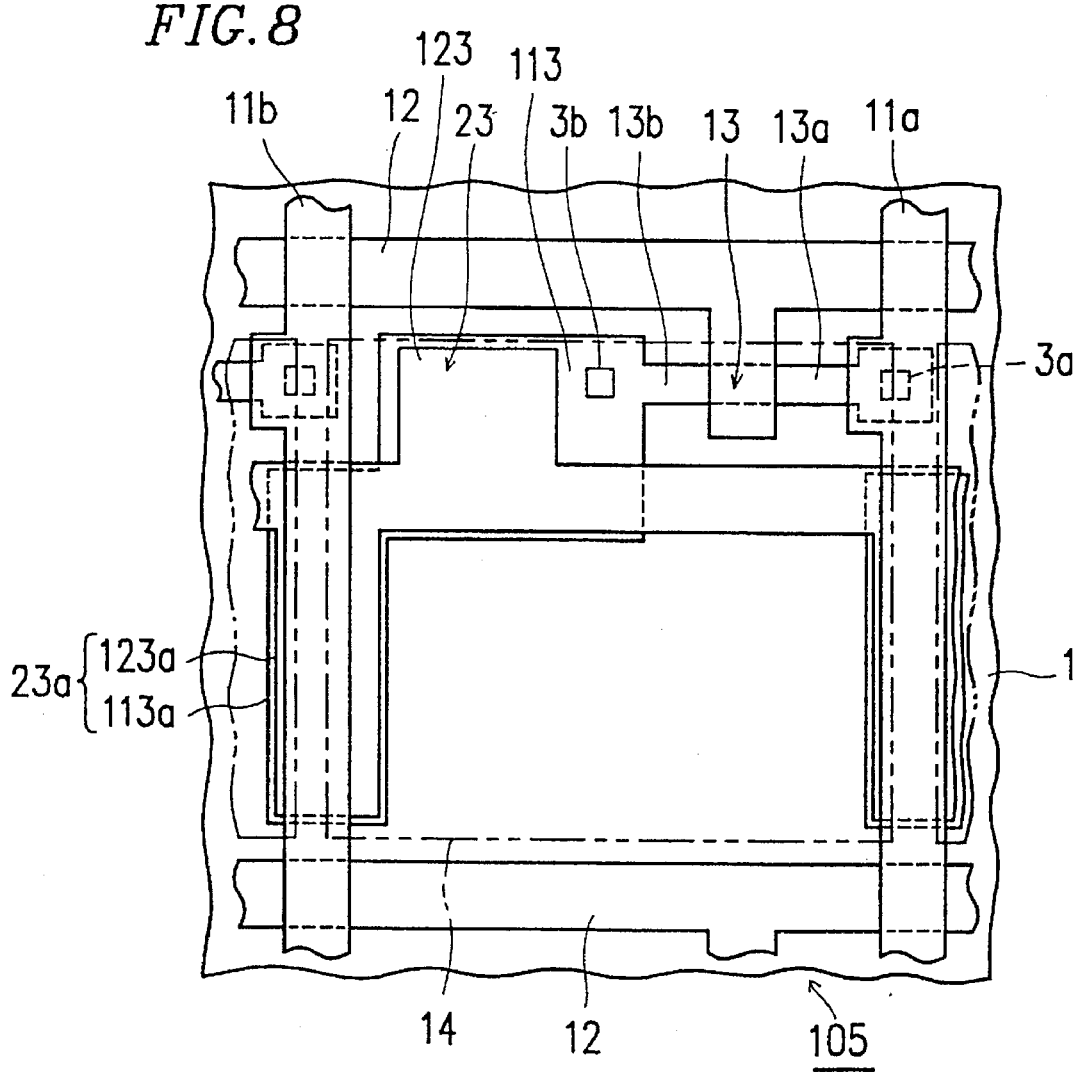

ACTIVE MATRIX LCD DEVICE HAVING TWO EQUAL COUPLING CAPACITANCES

BACKGROUND OF THE INVENTION

1. Field of the Invention

The present invention relates to a liquid crystal display panel using an active matrix substrate, and more particularly to the structure of an active matrix substrate.

2. Description of the Related Art

Liquid crystal display panels have been finding widespread use primarily in computer displays and in other fields ranging from audio visual apparatus such as projectors to amusement equipment such as game machines. It is desired to develop liquid crystal panels with higher resolution to meet the requirements of a variety of media.

FIG. 5 is a plan view of an active matrix substrate used in a conventional liquid crystal display panel; one pixel section of a plurality of identical pixel sections is shown here. FIG. 7 is a schematic circuit diagram showing the circuit structure for one pixel.

Referring to FIG. 5, the active matrix substrate 201 includes a quartz substrate 1 on which a plurality of liquid crystal driving electrodes (hereinafter called the pixel electrodes) 54 for driving the liquid crystals are arranged in a checkerboard pattern. A data signal line 11a for supplying data to the pixel electrode 54 and a data signal line 11b for supplying data to an adjacent pixel electrode are shown formed on the quartz substrate 1. The supply of data is controlled by a switching device 13 constructed from a thin film transistor (hereinafter abbreviated TFT). The quartz substrate 1 also has a plurality of scanning signal lines 12 arranged thereon intersecting at right angles with the data signal lines 11a and 11b. A portion of one scanning signal line 12 functions as the gate of the switching device 13 whose source 13a is connected to the data signal line 11a through a contact hole 3a and whose drain 13b is connected to the pixel electrode 54 through a contact hole 3b.

A storage capacitance ($C_S$) 23 forms a pixel Capacitance ($C_F$) 34 together with a liquid crystal capacitance ($C_{LC}$) formed between the pixel electrode 54 and a counter substrate electrode (not shown). A coupling capacitance ($C_{SD1}$) 35 is formed between the pixel electrode 54 and the data signal line 11a; a coupling capacitance ($C_{SD2}$) 36 is likewise formed between the pixel electrode 54 and the data signal line 11b connected to the adjacent pixel electrode.

The source, drain, and channel of the TFT 13 are formed from portions of a semiconductor layer 113 formed on the quartz substrate 1, while the scanning signal lines 12 and one common electrode 123 of the storage capacitance 23 are formed from, for example, a polysilicon layer doped with Phosphorus formed above the semiconductor layer 113 with an interlevel insulating film interposed therebetween. The portion 13c of the semiconductor layer 113 that faces the one electrode 123 functions as the other electrode of the storage capacitance. The data lines 11a and 11b are formed from an aluminum layer deposited above the layer of the common electrode with an interlevel insulating film interposed therebetween, and the pixel electrode 54 is formed from an indium tin oxide film (hereinafter sometimes referred to as the ITO film) formed above the aluminum layer with an interlevel insulating film interposed therebetween.

An operational description will be given below.

When the TFT 13 is selected by a scanning signal supplied from the scanning signal line 12 and placed in a conducting state, the data signal supplied from the data signal line 11a flows through the TFT 13 and is written into the pixel capacitance 34. Data are written into the pixel capacitance 34 connected to each scanning signal line 12 in this manner, until one picture field or frame is completed.

However, in the conventional active matrix substrate 201 shown in FIG. 5, the direction of the electric field being applied to the liquid crystals on the pixel electrode 54 is disturbed by the effects of different potentials from the data signal lines 11a, 11b and scanning signal lines 12. This results in the disruption of liquid crystal orientation, causing disclination and, in the case of a normally white display, light leakage and hence reduced contrast. Conventionally, this problem has been addressed by masking the disrupted portion of the liquid crystal orientation with a black matrix formed on the counter substrate to prevent display quality degradation.

In Japanese Patent Publication No. 4-74714 and Japanese Patent Laid-Open Publication NOS. 63-301924 and 58-172685, there is proposed a structure for solving the problem of the above active matrix substrate 201, in which a portion of the pixel electrode 64 is overlaid on the data signal line 11a with an insulating film sandwiched therebetween, as exemplified in FIG. 6, thereby reducing the disruption of the electric field. In the overlaid portion of the pixel electrode, the direction of the electric field on the pixel electrode due to the potential of the data signal line is perpendicular to the pixel electrode, which serves to suppress the disruption of the liquid crystal orientation on the pixel electrode.

The conventional active matrix substrate 201 has had a problem of crosstalk. When the TFT 13 is in a nonconducting state and the data signal written in the pixel capacitance 34 is retained there, the pixel potential is affected by data signals via the coupling capacitances 35 and 36; therefore, in a generally practiced driving method wherein the data signal polarity is inverted between fields or between frames, if either or both of the coupling capacitances 35 and 36 are appreciably greater than the pixel capacitance 34, crosstalk occurs in vertical directions. To overcome this problem, a method is known which drives the liquid crystals by inverting the data signal polarity between data signal lines (refer to Japanese Patent Publication No. 5-43118). According to this driving method, since the polarity of the data signal applied to one data signal line is different from that applied to the next data signal line, the variation of the pixel potential due to the data signal is cancelled out.

However, in the conventional active matrix substrate 202 of the structure shown in FIG. 6, the coupling capacitance $C_{SD1}$ between the pixel electrode 64 and its corresponding data signal line 11a becomes greater than the coupling capacitance $C_{SD2}$ between the pixel electrode 64 and the data signal line 11b connected to the pixel electrode in the adjacent column, and it is not possible to sufficiently cancel out the effect caused on the pixel electrode from the adjacent data signal line to which a signal of inverted polarity is applied. With the above driving method therefore, it is not possible to sufficiently eliminate crosstalk. Accordingly, in the conventional active matrix substrate, it has not been possible to prevent the disruption of the liquid crystal orientation and the occurrence of crosstalk at the same time, in developing a higher resolution liquid crystal display panel.

SUMMARY OF THE INVENTION

The liquid crystal display panel of this invention includes an active matrix substrate. The active matrix substrate includes: a substrate; a plurality of pixel electrodes for driving a liquid crystal, the pixel electrodes being arranged in a matrix on the substrate; a plurality of data signal lines for supplying data signals to pixel electrodes of a corresponding column; a plurality of switching devices for electrically connecting each of the data signal lines to the pixel electrodes of the corresponding column; a plurality of scanning signal lines for controlling the switching devices to be conductive; and a plurality of storage capacitances respectively connected to terminals of the switching devices which are connected to the pixel electrodes. Each of the pixel electrodes overlaps a corresponding one of the data signal lines with an insulating film interposed therebetween in a first region and overlaps an adjacent one of the data signal lines which is connected to pixel electrodes of a neighbor column with the insulating film interposed therebetween in a second region. A first coupling capacitance formed in the first region is substantially equal to a second coupling capacitance formed in the second overlap portion, and wherein the active matrix substrate receives the data signals in which polarities are inverted between fields or frames. The polarities are different between the corresponding one and the adjacent one of the data signal lines.

Alternatively, the liquid crystal display panel of this invention includes an active matrix substrate, the active matrix substrate including: a substrate; a plurality of pixel electrodes for driving a liquid crystal, the pixel electrodes being arranged in a matrix on the substrate; a plurality of conductive films for electrically connecting the pixel electrodes, respectively; a plurality of data signal lines for supplying data signals to pixel electrodes .of a corresponding column; a plurality of switching devices for electrically connecting each of the data signal lines to the pixel electrodes of the corresponding column; a plurality of scanning signal lines for controlling the switching devices to be conductive; and a plurality of storage capacitances respectively connected to terminals of the switching devices which are connected to the pixel electrodes. Each of the pixel electrodes overlaps one of adjacent two of the data signal lines with an insulating film interposed therebetween, corresponding one of the conductive films overlaps the other of the adjacent two of the data signal lines with the insulating film interposed therebetween. A first coupling capacitance formed between the each of the pixel electrodes and the one of the adjacent two of the data signal lines is substantially equal to a second coupling capacitance formed between the each of the conductive films and the other of the adjacent two of the data signal lines. The active matrix substrate receives the data signals in which polarities are inverted between fields or frames, and the polarities are different between the adjacent two of the data signal lines.

In one embodiment of the invention, each of the data signal lines includes a capacitance adjusting portion for adjusting at least either one of the first coupling capacitance and the second coupling capacitance.

In another embodiment of the invention, the switching devices comprise thin film transistors, and a part of each of the conductive film serves as a light blocking member covering a channel portion of the corresponding one of the thin film transistors.

In still another embodiment of the invention, the storage capacitances include extended portions formed below the data signal lines.

The active matrix substrate of the invention includes: a substrate; a plurality of data signal lines formed on the substrate, the data signal lines transmitting data signals having polarities inverted between fields or frames, the polarities of the data signals being different between adjacent two of the data signal lines; a plurality of scanning signal lines formed on the substrate to cross the data signal lines substantially at right angles; a pixel electrode disposed in the vicinity of each of crossings of the data signal lines and the scanning signal lines; and a switching device for electrically connecting the pixel electrode with corresponding one of the data signal lines and corresponding one of the scanning signal lines. The pixel electrode includes a first portion covering the corresponding one of the data signal lines and a second portion covering another one of the data signal lines which is adjacent to the corresponding one of the data signal lines, the pixel electrode being insulated from the corresponding one and the another one of the data signal lines by an insulating film. A first coupling capacitance formed between the first portion and the corresponding one of the data signal lines is substantially equal to a second coupling capacitance formed between the second portion and the another one of the data signal lines.

In one embodiment of this invention, the active matrix substrate further includes a storage capacitance connected to the switching device, electrodes of the storage capacitance being formed below the another one of the data signal lines to extend along the another one of the data signal lines.

In another embodiment of this invention, extended portions of the electrodes of the storage capacitances serve as a light blocking member.

In still another embodiment of this invention, the pixel electrodes has a first edge and a second edge, the first edge being partially located on the corresponding one of the data signal lines and the second edge being partially located on the another one of the date signal lines.

In still another embodiment of this invention, each of the data signal lines includes a projected portion, the second portion of the pixel electrode covering the projected portion of the another one of the data signal lines.

Alternatively, the active matrix substrate includes: e substrate; a plurality of data signal lines formed on the substrate, the data signal lines transmitting data signals having polarities inverted between fields or frames, the polarities of the data signals being different between adjacent two of the data signal lines; a plurality of scanning signal lines formed on the substrate to cross the data signal lines substantially at right angles; a pixel electrode disposed in the vicinity of each of crossings of the data signal lines and the scanning signal lines; a switching device for electrically connecting the pixel electrode with corresponding one of the data signal lines and corresponding one of the scanning signal lines; and a conductive film formed below the electrode with e first insulating film interposed therebetween. The conductive film is electrically connected to the pixel electrode via a contact hole formed in the first insulating film. The pixel electrode includes an overlap portion covering the corresponding one of the data signal lines. The conductive film covers another one of the data signal lines which is adjacent to the corresponding one of the data signal lines, the conductive film being insulated from the another one of the data signal lines by a second insulating film. A first coupling capacitance formed between the pixel electrode and the corresponding one of the data signal lines is substantially equal to a second coupling capacitance formed between the conductive film and the another one of the data signal lines.

In one embodiment of this invention, each of the data signal lines includes a projected portion, the conductive film covering the projected portion of the another one of the data signal lines.

According to the present invention, since the pixel electrode is formed overlapping the data signal line with an interlevel insulating film interposed therebetween, the direction of the electric field being applied to the liquid crystals on the pixel electrode can be prevented from being disturbed by the effects of different potentials from the signal lines adjacent to the pixel electrode. More specifically, in a region where the pixel electrode overlaps the data signal line across the interlevel insulating film, the direction of the electric field on the pixel electrode due to the potential of the data signal line is perpendicular to the pixel electrode, which serves to suppress the disruption of the liquid crystal orientation on the pixel electrode.

Furthermore, since the coupling capacitance between the pixel electrode and its corresponding data signal line is made substantially equal to that between the pixel electrode and the data signal line corresponding to the adjacent pixel electrode, by reversing the data signal polarity between adjacent data signal lines the variation of the pixel potential due to the data signals applied to the data signal lines on both sides of the pixel electrode is cancelled out, thus eliminating the occurrence of crosstalk caused by the coupling capacitances between the pixel electrode and the data signal lines.

Accordingly, the disruption of the liquid crystal orientation can be prevented and a liquid crystal display comprising fine pixels and free from crosstalk can be realized.

In the present invention, each of the liquid crystal driving electrodes arranged in each column in a matrix is formed in such a manner as to overlap a data signal line on one side of the liquid crystal driving electrode with an interlevel insulating film interposed therebetween, while a conductive film electrically connected to the liquid crystal driving electrode is formed below it in such a manner as to overlap a data signal line on the other side of the liquid crystal driving electrode with an interlevel insulating film interposed therebetween. Accordingly, in a pixel on one side of a data signal line, a coupling capacitance is formed between the data signal line and the liquid crystal driving electrode of the pixel, and in a pixel on the other side of the data signal line, a coupling capacitance is formed between the data signal line and the conductive film connected to the liquid crystal driving electrode of the pixel. This structure not only serves to prevent the disruption of the liquid crystal orientation as well as the occurrence of crosstalk, but makes it possible to make the coupling capacitance between the liquid crystal driving electrode and the data signal line on one side thereof substantially equal to the coupling capacitance between it and the data signal line on the other side thereof while securing sufficient space between adjacent liquid crystal driving electrodes even when the pixel size is reduced.

In the present invention, a storage capacitance is formed to extended below the data signal line. A common electrode layer serving as one electrode of the storage capacitance is formed from, for example, a polycide layer or a metal layer, and therefore the common electrode layer acts as a light blocking layer. This structure serves to suppress the contrast degradation caused by the disruption of the liquid crystal orientation near the data signal line.

Furthermore, a light blocking member conventionally used, such as a black matrix, need not be provided for the portion covered by the electrode layers, or the area of the black matrix can be reduced. Therefore, the margin for alignment errors of the black matrix or the like to the pixel can be eliminated or reduced, which improves the opening ratio.

More specifically, a black matrix is usually formed on a counter substrate placed opposite the active matrix substrate, but this requires a margin for placement errors between the counter substrate and the active matrix substrate, which is the margin for alignment errors and which substantially decreases the opening ratio. In such cases, if the common electrode layer of the storage capacitance are used as the light blocking layer, the black matrix need not be provided for the data signal line region or the area in which the black matrix is formed can be reduces, which effectively avoids the substantial decrease in the opening ratio caused by the margin for placement errors.

Thus, the invention described herein makes possible the advantage of providing a liquid crystal display panel that can prevent the disruption of the liquid crystal orientation and the occurrence of crosstalk at the same time.

This and other advantages of the present invention will become apparent to those skilled in the art upon reading and understanding the following detailed description with reference to the accompanying figures.

BRIEF DESCRIPTION OF THE DRAWINGS

FIG. 8 is a plan view showing one pixel section of an active matrix substrate according to a fifth example of the present invention;

DESCRIPTION OF THE PREFERRED EMBODIMENTS

The examples of the present invention will now be described.

EXAMPLE 1

Figure 1:
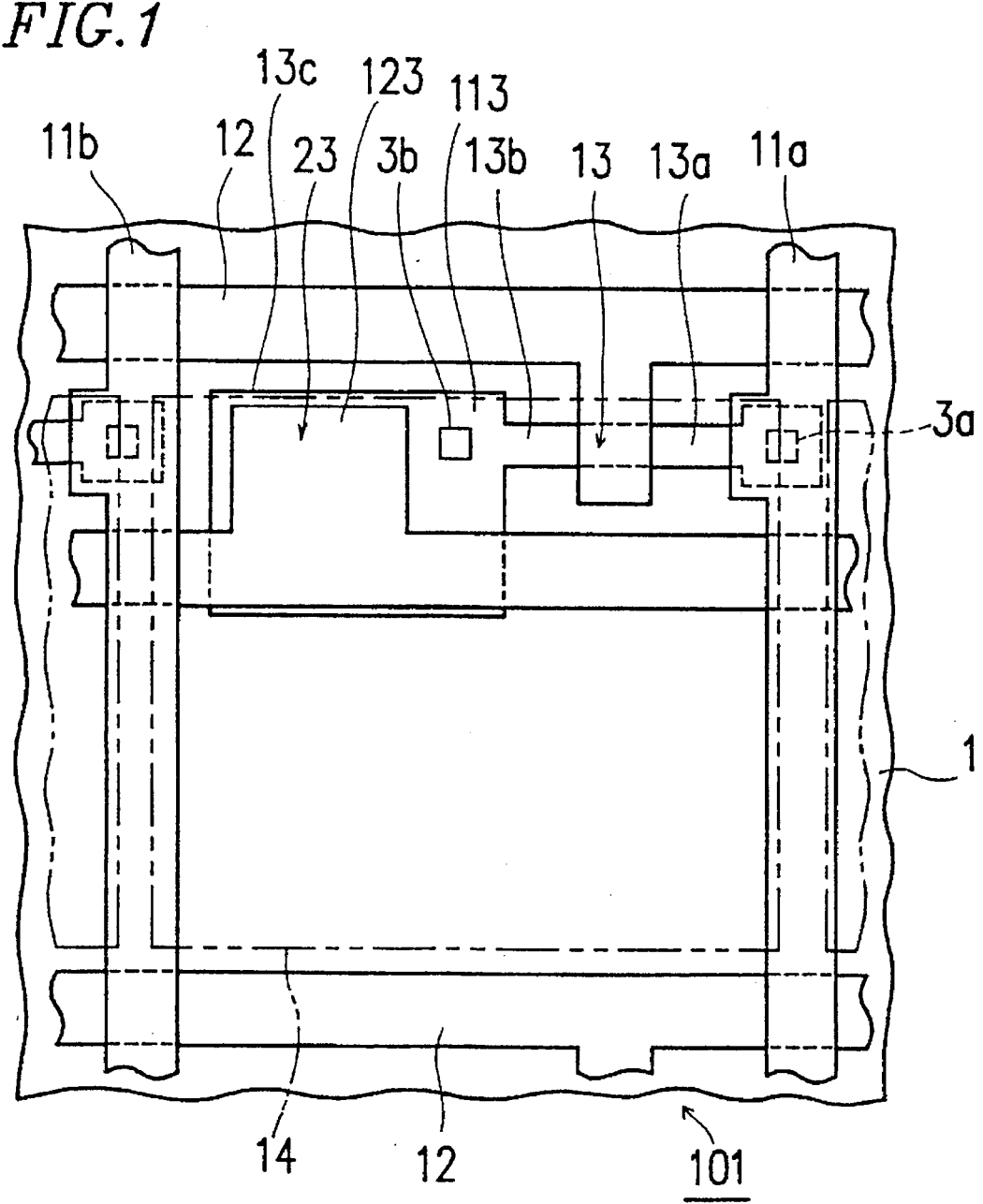
FIG. 1 is a plan view showing one pixel section of an active matrix substrate according to a first example of the present invention.
Figure 5:
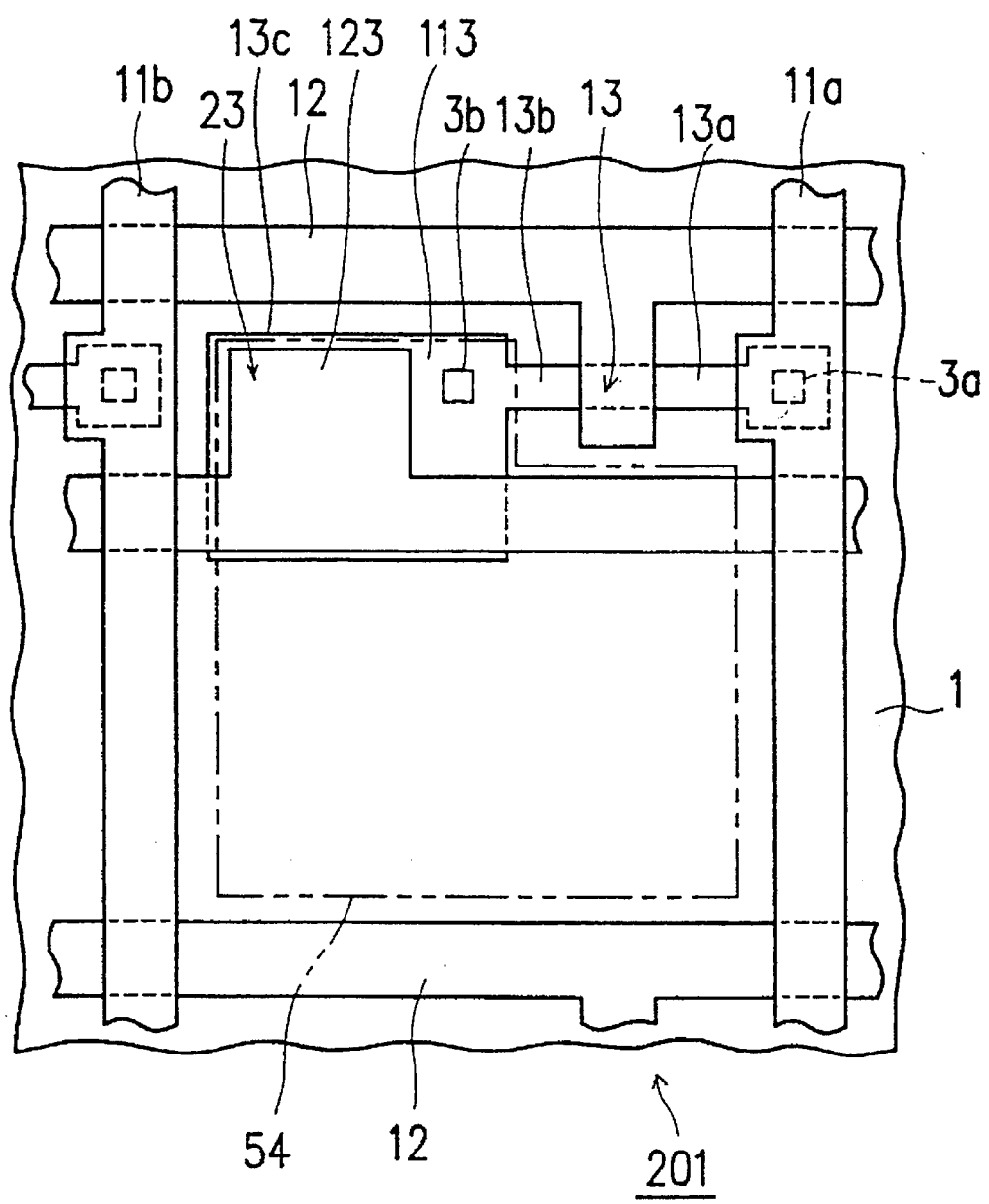
FIG. 5 is a plan view showing one pixel section of an active matrix substrate of a conventional liquid crystal display panel.

FIG. 1 is a plan view of a first example of an active matrix substrate according to the present invention. One of a plurality of identical pixel sections of the substrate is shown here. In the figure, the same reference numerals as those used in FIG. 5 designate the same parts as those of the conventional active matrix substrate 201.

Figure 7:
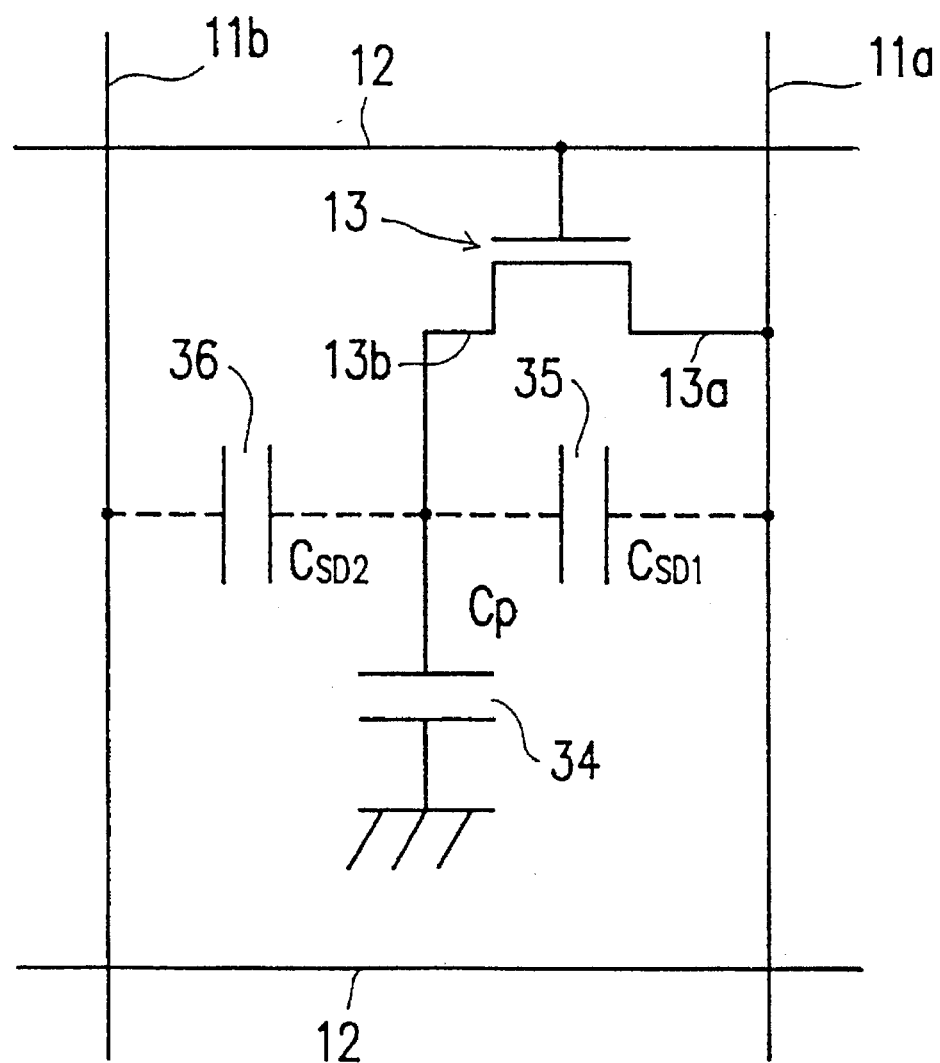
FIG. 7 is a schematic circuit diagram showing an equivalent circuit for the one pixel section.

In the active matrix substrate 101, the pixel electrode 14 is formed with portions thereof overlaid on the data signal lines 11a and 11b on both sides thereof, with an interlevel insulating film interposed to prevent the pixel electrode 14 from short-circuiting to the data signal lines 11a and 11b. In forming the pixel electrode 14, the area of the portion overlapping the data signal line 11a and the area of the portion overlapping the data signal line 11b are adjusted so that the coupling capacitance $C_{SD1}$ in FIG. 7, i.e., the capacitance between the pixel electrode and the data signal line 11a, becomes approximately equal to the coupling capacitance $C_{SD2}$ in FIG. 7, i.e., the coupling capacitance between the pixel electrode and the data signal line 11b.

In the liquid crystal display panel of the present example, the liquid crystals are driven by the data signal having polarity which is inverted between fields or between frames and is inverted from one data signal line to the next, that is, from the data signal line 11a to the data signal line 11b.

Next, the effect and advantage of the above structure will be described. In the active matrix substrate 101, since the pixel electrode 14 is formed overlapping the data signal lines 11a and 11b on both sides thereof and sandwiching an interlevel insulating film therebetween, the direction of the field electric being applied to the liquid crystals near the periphery of the pixel electrode 14 is prevented from being disturbed by the potentials of its adjacent data signal lines.

Furthermore, since the coupling capacitances 35 and 36 between the pixel electrodes 14 and the data signal lines 11a and 11b on both sides thereof are approximately equal, the variation of the pixel potential through the coupling capacitances from the adjacent data signal lines can be cancelled out. Accordingly, in the driving method involving inverting the data signal polarity between fields or between frames, the occurrence of crosstalk in vertical directions can be eliminated by making provisions so that data signals of different polarities are applied to the data signal line 11a and data signal line 11b, respectively.

Thus, the present example eliminates the occurrence of crosstalk in vertical directions while at the same time preventing the disruption of the liquid crystal orientation caused by electric field disturbances from the data signal lines on both sides of the pixel electrode.

However, since the adjacent pixels 14 across each data signal line are formed overlapping the same data signal line along its widewidth direction, if the pixel size is reduced and the width of the data signal line is also reduced to maintain opening ratio, sufficient spacing cannot be provided between the adjacent pixels 14.

The second to fourth examples hereinafter described are effective for miniaturization of pixels.

EXAMPLE 2

Figure 2:
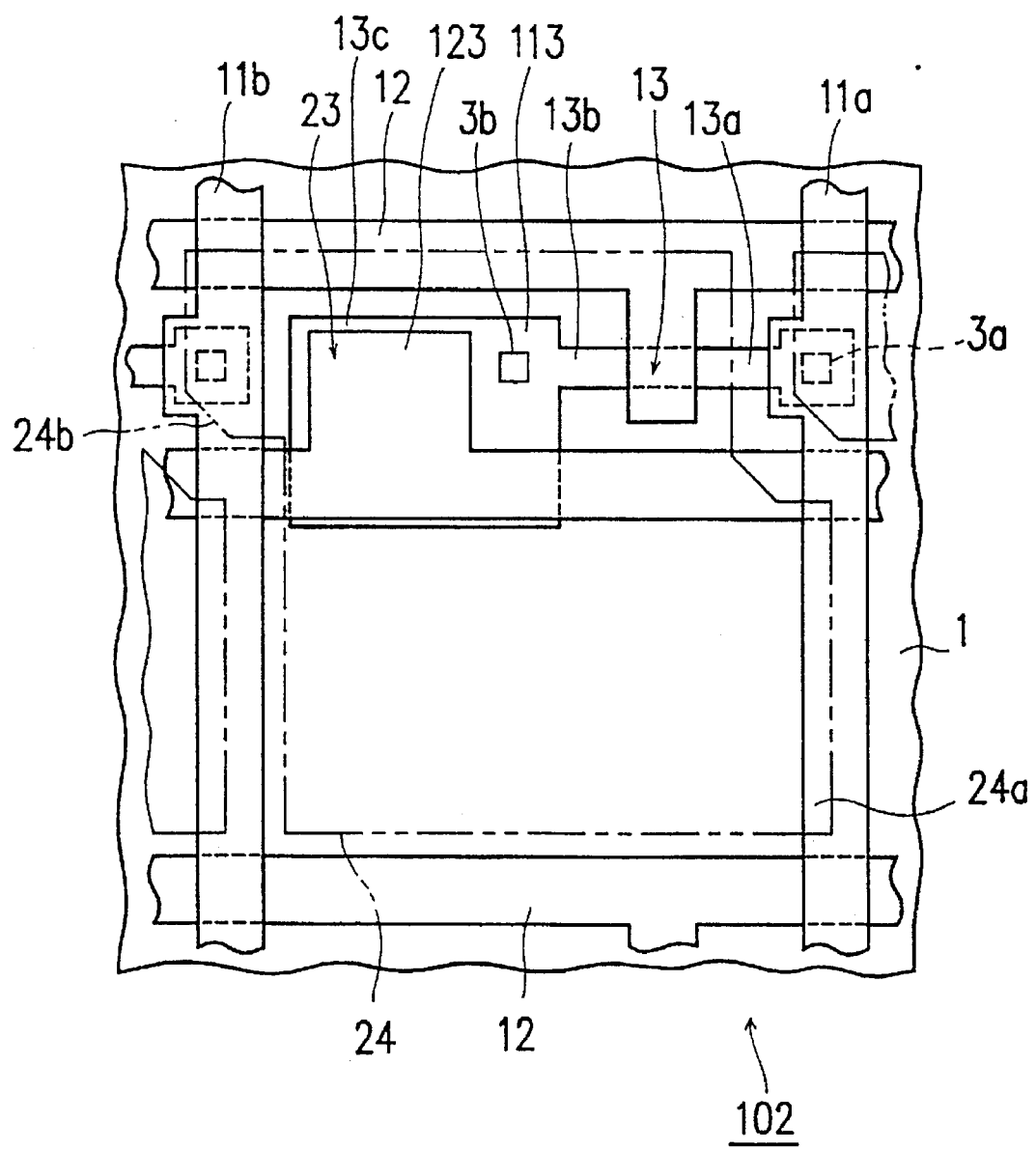
FIG. 2 is a plan view showing one pixel section of an active matrix substrate according to a second example of the present invention.

FIG. 2 is a plan view of the second embodiment of an active matrix substrate according to the present invention. One of a plurality of identical pixel sections of the substrate is shown here.

Figure 6:
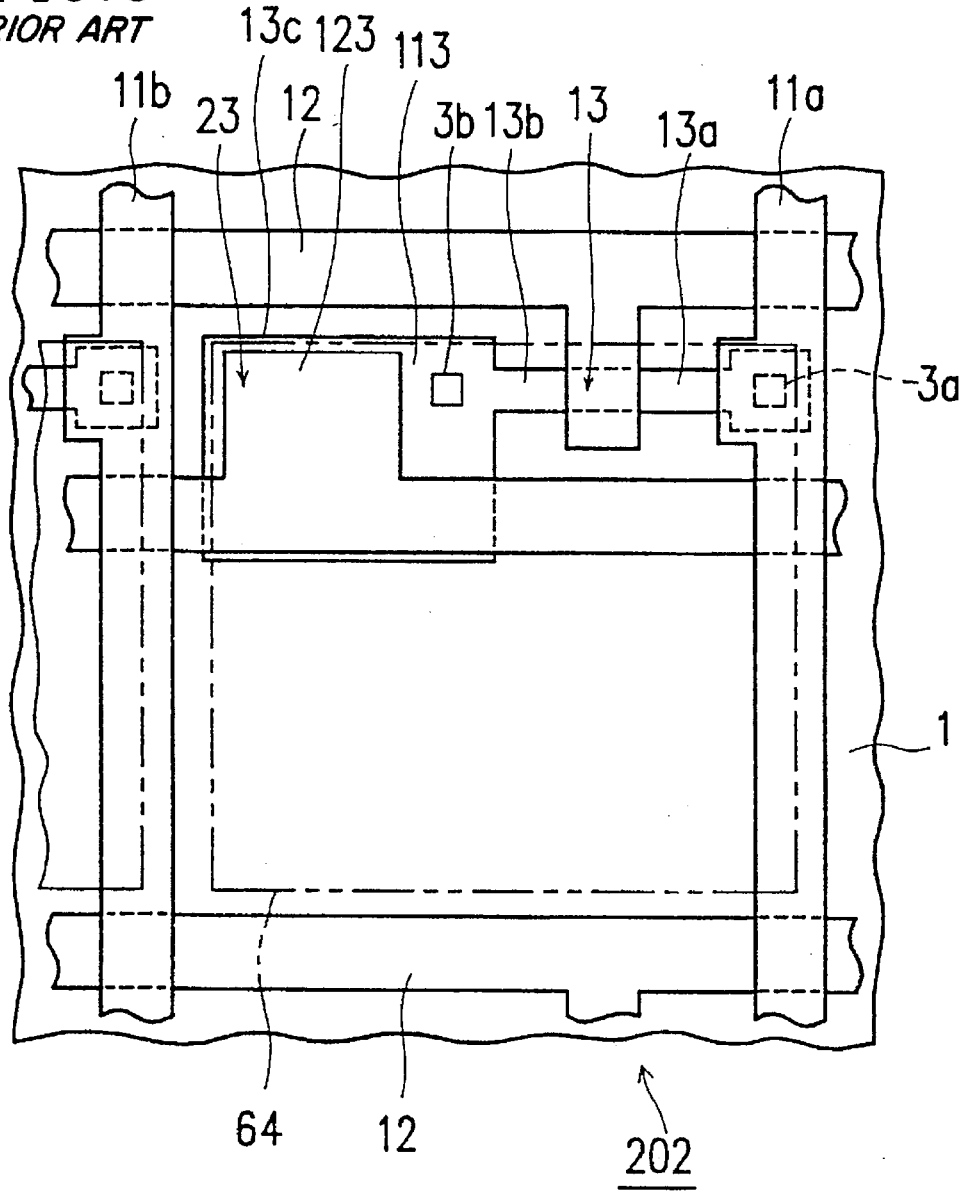
FIG. 6 is a plan view showing one pixel section of another active matrix substrate of a conventional liquid crystal display.

In the active matrix substrate 102 of this example, each of the sides of the pixel electrode 24, corresponding to the sides of the pixel electrode 64 (shown in FIG. 6) parallel to the data signal lines, partially overlaps the adjacent data signal line as shown in FIG. 2, whereas in FIG. 6, only one of the sides of the pixel electrode 64 overlaps on the data signal line 11a completely.

More specifically, one side of the pixel electrode 24, which is closer to the data signal line 11a, overlaps the data signal line 11a. That is, one of a pair of edges of the pixel electrode 24, which are parallel to the data signal lines, is partially located on the data signal line 11a. The other side of the pixel electrode 24, which is closer to the data signal line 11b, overlaps the data signal line 11b. That is, the other of the edges is partially located on the data signal line 11b. The area of the region 24a in which the pixel electrode 24 overlaps the data signal line 11a and the area of the region 24b in which the pixel electrode 24 overlaps on the data signal line 11b are determined so that the coupling capacitance $C_{SD1}$ between the pixel electrode 24 and the data signal line 11a becomes approximately equal to the coupling capacitance $C_{SD2}$ between the pixel electrode 24 and the data signal line 11b.

To reduce the effects of electric field disturbances, it is desirable that the region 24b be located as far as possible from the aperture, i.e., an opening in the black matrix masking the transistor and signal line regions, and that the portions of the pixel electrode 24 that are parallel to the data signal lines (in this example, the straight line portions) be located within the aperture. In other respects, the structure is the same as that of the foregoing first example.

In the structure of the present example, since the overlapping portion 24b between the pixel electrode 24 and the adjacent data signal line is formed extending into a masked portion, unlike the first example there is no possibility of becoming unable to secure sufficient spacing between the adjacent pixel electrodes when the pixel size is reduced. Thus, the active matrix substrate of the present examples is effective for miniaturization of pixels in which the pitch of pixels is 50 μm or less, for example.

EXAMPLE 3

Figure 3:
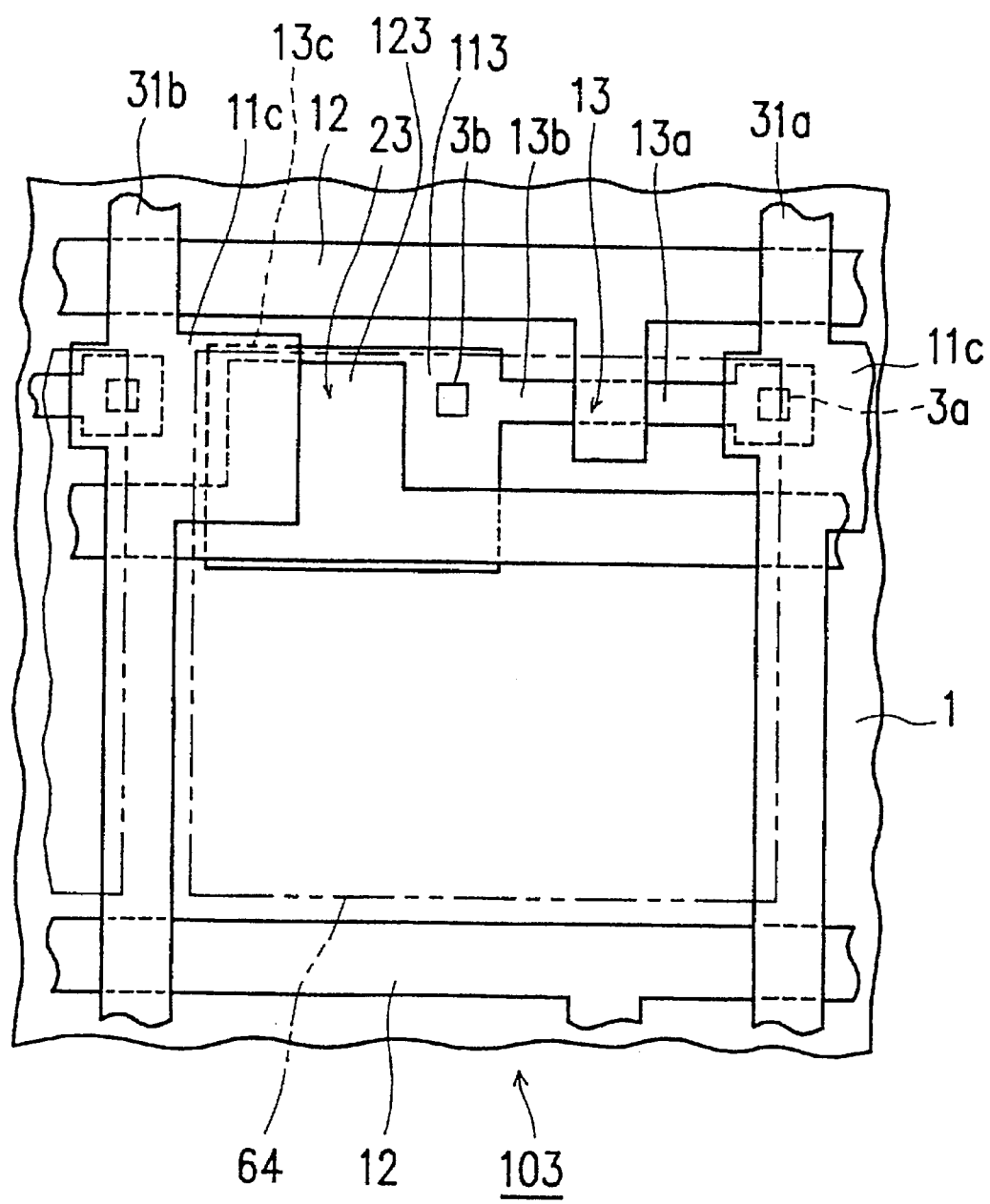
FIG. 3 is a plan view showing one pixel section of an active matrix substrate according to a third example of the present invention.

Next, the third example of the present invention will be described. FIG. 3 is a plan view of the third example of an active matrix substrate according to the present invention. One of a plurality of identical pixel sections of the substrate is shown here.

The active matrix substrate 103 of the present example includes data signal lines 31a and 31b which are the same as the straight line-like data signal lines 11a and 11b formed in the conventional active matrix substrate 202 shown in FIG. 6, except that a projection 11c being overlapped by the pixel electrode 64 is added to each data signal line. In this structure, the area of the overlapped region in which the pixel electrode 64 overlaps the projection 11c is adjusted so that the coupling capacitance $C_{SD1}$ between the pixel electrode 64 and the data signal line 31a becomes approximately equal to the coupling capacitance $C_{SD2}$ between the pixel electrode 64 and the data signal line 31b. In this example, the projection 11c added to the data signal line for capacitance adjustment is formed beneath a portion masked by the black matrix in order to avoid reducing the opening ratio. In other respects, the structure is the same as that of the conventional active matrix substrate 202 shown in FIG. 6.

In the present example, the data signal lines are each formed to have an additional projection 11c being overlapped by the pixel electrode. Therefore, the active matrix substrate of the present example is effective for miniaturization of pixels, as in the second example.

EXAMPLE 4

Figure 4A:
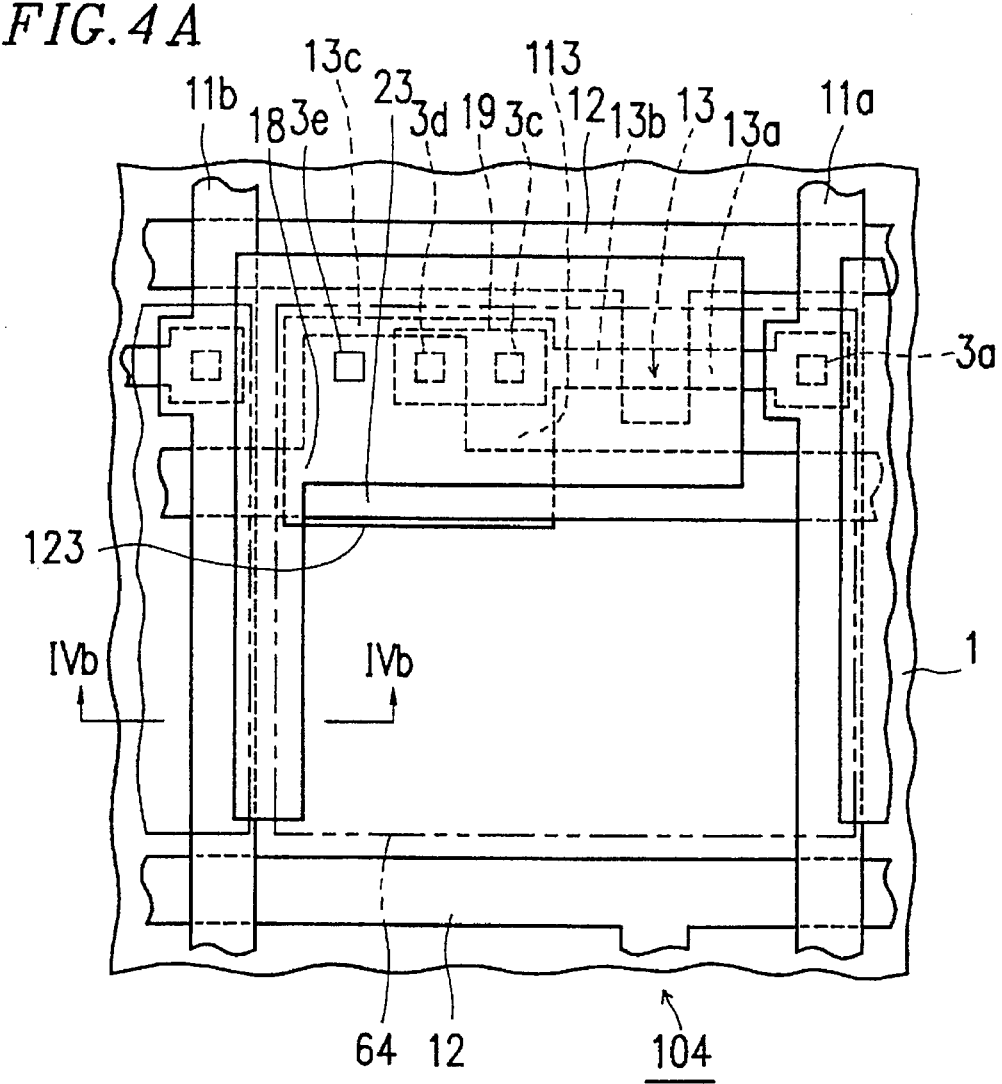
FIG. 4A is a plan view showing one pixel section of an active matrix substrate according to a fourth example of the present invention.
Figure 4B:
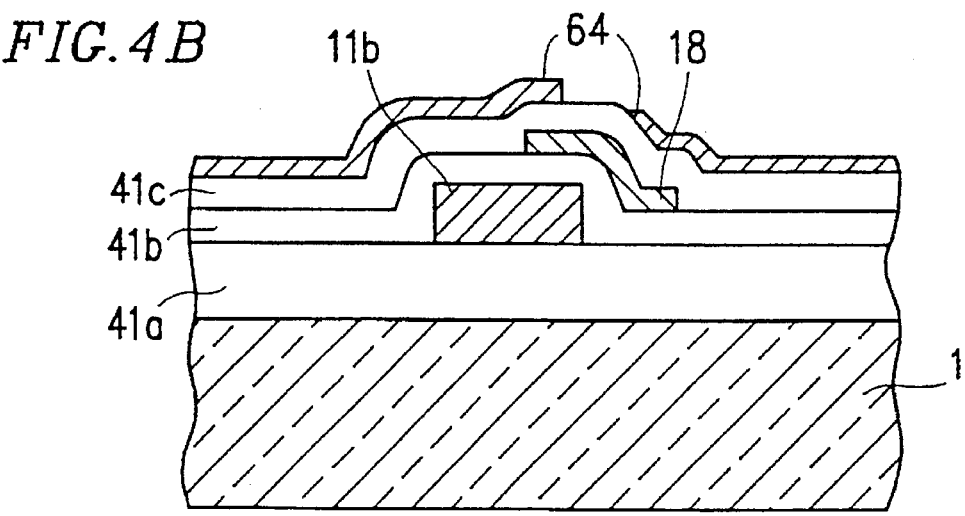
FIG. 4B is a cross-sectional view of the active matrix substrate in FIG. 4A, along a line IVb—IVb in FIG. 4A.

Next, the fourth example of the present invention will be described. FIG. 4A is a plan view showing one of a plurality of identical pixel sections of the active matrix substrate 104 of the present example. FIG. 4B is a cross sectional view taken along line IVb—IVb in FIG. 4A.

In the active matrix substrate 104, a drain electrode 19 and a metal film 18 are added. The drain electrode 19 is formed simultaneously with the data signal lines 11a and 11b using the same material, for example, aluminum. The metal film 18 is formed, for example, from TiW and is located between the drain electrode 19 and the pixel electrode 64 with insulating films 41b and 41c respectively interposed. The drain electrode 19 is connected to the drain 13b of the TFT 13 via a contact hole 3c, while the metal film 18 is connected to the drain electrode 19 via a contact hole 3d and also to the pixel electrode 64 via a contact hole 3e. The metal film 18 also serves as a light blocking film for covering a region in which the TFT 13 is formed and regions between the pixel electrode 64 and the lines 11b and 12, as shown in FIG. 4A.

In the active matrix substrate 104, the pixel electrode 64 overlaps the data signal line 11a as in the active matrix substrate shown in FIG. 6. The area of the overlapped region between the pixel electrode 64 and the data signal line 11a and the area of the overlapped region between the metal film 18 and the data signal line 11b are adjusted so that the coupling capacitance $C_{SD1}$ between the pixel electrode 64 and the data signal line 11a becomes substantially equal to the coupling capacitance $C_{SD2}$ between the metal film 18 and the data signal line 11b.

In this example, the metal film 18 is used as a light blocking film. However, it will be recognized that the metal film 18 need not necessarily be formed to cover the TFT 13 and the shape of the metal film 18 is not limited to that shown in FIG. 4A.

As shown in FIG. 4B, an insulating film 41a is formed for insulating the data signal lines 11a and 11b from the underlying scanning lines 12, while the insulating film 41b is formed for insulating the data signal line 11a and 11b from the metal film 18 formed thereabove, and the insulating film 41c is formed for insulating the ITO film as the pixel electrode 64, from the underlying metal film 18.

In the fourth example, the metal film 18 is formed below the pixel electrode 64 so as to overlap the data signal line 11b, and the pixel electrode 64 and the metal film 18 are connected together through the contact hole 3e. In addition, the area of the region in which the pixel electrode 64 overlaps the data signal line 11a and the area of the region in which the metal film 18 overlaps the data signal line 11b are adjusted so that the coupling capacitances $C_{SD1}$ and $C_{SD2}$ between the pixel electrode 64 and the data signal lines 11a and 11b on both sides thereof become substantially equal. Accordingly, the active matrix substrate of this example is effective for miniaturization of pixels, as in the second example.

In the present example, the additional projection 11c of the data signal line, which is overlapped by the pixel electrode 64, may be provided for the purpose of adjusting the coupling capacitances $C_{SD1}$ and $C_{SD2}$, as in the third example. In this case, the metal film 18 connected to the pixel electrode 64 via the contact hole 3e is formed to overlap the projection 11c.

In the present example, an edge portion of the data signal line 11b, which is formed from aluminum or the like to have a thickness of 600 nm to 1 μm, is covered with the metal film 18, as shown in FIG. 4B. By forming the metal film 18 to have a thickness, for example, of 50 nm to 150 nm, it is possible to reduce the step on the substrate 104 near an opening in the black matrix, which prevents the disruption of the liquid crystal orientation and the degradation in contrast. The thicknesses of the data signal line 11h and the metal film 18 are not limited to the above thicknesses, as long as the thickness of the metal film 18 is set so that the step on the substrate. 104 near an opening the black matrix.

EXAMPLE 5

FIG. 8 is a plan view of an active matrix substrate of a liquid crystal display panel of the fifth example according to the present invention. One of a plurality of identical pixel sections of the substrate is shown here. In the figure, the same reference numerals as those in FIG. 1 designate the same parts.

In the active matrix substrate 105, the storage capacitance 23 has an extended portion 23a formed below the data signal lines 11a and 11b, with its width slightly greater than that of the data signal lines 11a and 11b. In other respects, the structure of the active matrix substrate in the present example is the same as that in the first example.

In the above structure, the common electrode layer 123 of the storage capacitance 23, is formed below the data signal lines 11a and 11b so as to extend along the data signal lines 11a and 11b, while the semiconductor layer 113 of the TFT 13 is also formed below the data signal lines 11a and 11b so as to extend along the data signal lines 11a and 11b. The extended portion 123a (the portion underlying the data signal line) of the common electrode layer 123 and the extended portion 113a (the portion underlying the data signal line) of the semiconductor layer 113 respectively serve as top and bottom electrodes of the extended portion 23a underlying the data signal lines 11a and 11b.

In this example, since the extended portion 23a of the storage capacitance 23 is formed underneath the data signal lines 11a and 11b, the extended portion 123a forming part 23a of the storage capacitance 23, can be used as a light blocking member. This suppresses contrast degradation caused by the disruption of the liquid crystal orientation near the data signal line.

A light blocking member formed on the counter substrate, such as a black matrix, need not be provided for the portion covered by the electrode 123a of the extended portion 23a of the storage capacitance 23, or the area on the counter substrate in which the light blocking member is formed can be reduced. Therefore, the margin for alignment errors of the black matrix or the like to the pixel can be reduced, which increases the opening ratio. However, compared to the structure in which only the data signal lines 11a and 11b are used as the light blocking members, the opening ratio decreases. This is because the extended portion 123a, of the polysilicon layer 123 is wider than the data signal lines 11a and 11b. In the active matrix 105 of the present example, the disruption of the liquid crystal orientation due to the step at the edge portion of the data signal line, as well as the disruption of the liquid crystal orientation in a portion close to the edge portion of the data signal line near the periphery of the pixel electrode, can be masked by the electrodes 123a and 113a of the storage capacitance 23. Therefore, contrast degradation caused by the disruption of the liquid crystal orientation can be suppressed.

By using the common electrode of the storage capacitance formed below the data signal lines as a light blocking member, contrast degradation caused by the disruption of the liquid crystal orientation near the data signal line can be suppressed while avoiding significant decrease in the opening ratio.

EXAMPLE 6

Figure 9A:
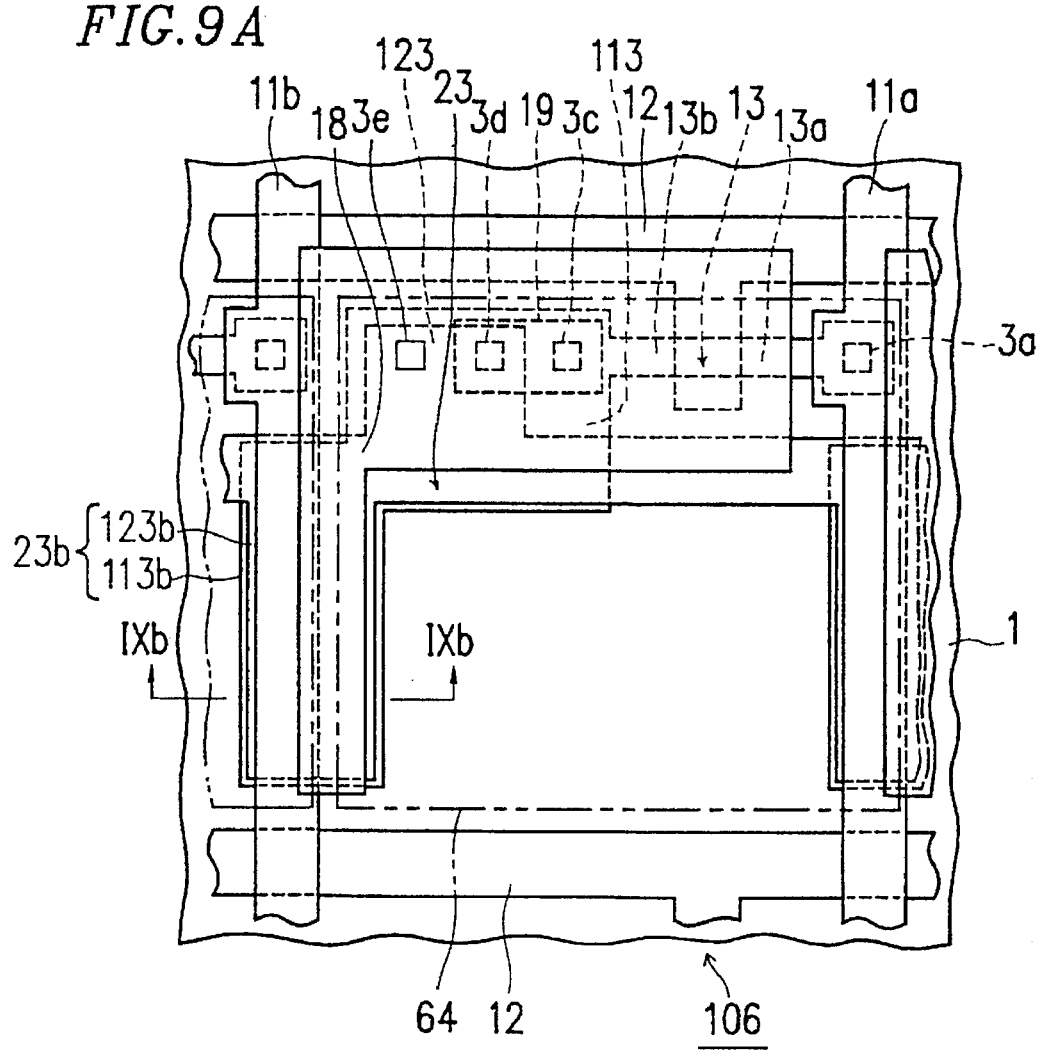
FIG. 9A is a plan view showing a one pixel section of an active matrix substrate according to a sixth example of the present invention.
Figure 9B:
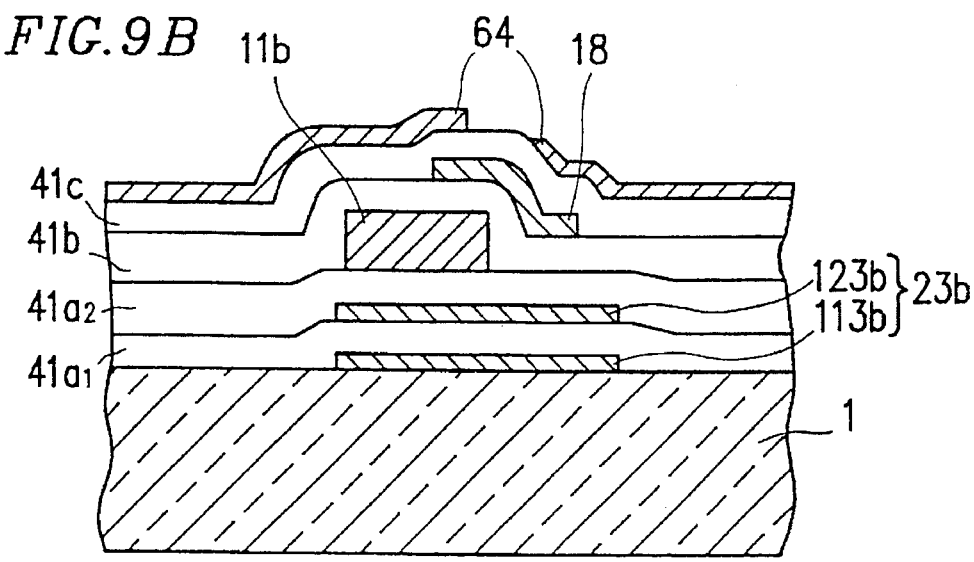
FIG. 9B is a cross-sectional view showing the structure along line IXb—IXb in FIG. 9A.

FIG. 9A is a plan view of an active matrix substrate of a liquid crystal display panel according to a sixth example. In FIG. 9A, one of a plurality of identical pixel sections of the active matrix substrate 106 is shown. FIG. 9B is a cross sectional view of the active matrix substrate 106 taken along line IXb—IXb in FIG. 9A. In FIGS. 9A and 9B, the same reference numerals as those in FIGS. 4A and 4B designate the same parts.

In the active matrix substrate 106, the storage capacitance 23 has an extended portion 23b formed underneath each data signal lines, with its width slightly greater than that of a region where the data signal line and the metal film 18 are formed.

In this structure, the common electrode layer 123, serving as one electrode of the storage capacitance 23, is formed below the data signal lines 11a and 11b and the metal film 18, to have extended portions 123b which extends along the data signal lines 11a and 11b and the metal film 18. The semiconductor layer 113 of the TFT 13 is also formed below the data signal lines 11a and 11b and the metal film 18, to have extended portions 123b which extends along the data signal lines 11a and 11b and the metal film 18. The extended portion 123b (the portion underlying each data signal line) of the common electrode layer 123 and the extended portion 113b (the portion underlying each data signal line) of the semiconductor layer 113 respectively act as top and bottom electrodes of the extended portion 23b of the storage capacitance 23.

As shown in FIG. 9B, an insulating film $41a_1$ is formed for insulating the semiconductor layer 113, which includes the extended portion 113b and is directly formed on the substrate 1, from scanning signal line 12 and the common electrode layer 123 which includes the extended portion 123b. On the insulating film $41a_1$, an insulating film $41a_2$ is formed to cover the common electrode layer 123, whereby the polysilicon layer 123 is insulated from the data signal lines 11a and 11b formed thereabove. The two insulating films $41a_1$ and $41a_2$ correspond to a single insulating film 41a in FIG. 4.

In other respects, the structure of the active matrix substrate in the present example is the same as that of the active matrix substrate in the fourth example.

The structure described in the sixth example not only has the same effects as the fourth example, but offers the effect of suppressing contrast degradation caused by the disruption of the liquid crystal orientation near the data lines, while at the same time avoiding significant decrease in the opening ratio.

In any of the above examples, the active matrix substrate has been described as having a plurality of pixels arranged in a checkerboard pattern (i.e., a matrix form), but it will be appreciated that the pixel arrangement is not limited to the illustrated pattern. Other pixel arrangements may be employed, for example a delta arrangement in which the pixels in the odd-numbered rows are staggered with respect to the pixels in the even-numbered rows. In this arrangement, each data signal line is bent to conform to the arrangement of pixels in each column, but the same effects as those of the foregoing embodiments can be obtained.

Using the active matrix substrate of the present invention, the disruption of the liquid crystal orientation can be prevented and a liquid crystal display comprising fine pixels free from crosstalk can be realized.

More specifically, according to the present invention, since each pixel electrode is formed to overlap adjacent data signal lines with an insulating film interposed therebetween, the direction of the electric field applied to the liquid crystal on the pixel electrode is prevented from being disturbed by the effect of a different potential from the data signal line.

The coupling capacitance between the pixel electrode and its corresponding data signal line is made substantially equal to the coupling capacitance between the pixel electrode and the data signal line corresponding to the adjacent pixel electrode. Therefore, when a driving method is used in which the polarity of the data signal is inverted between the adjacent data signal lines, the effect on the pixel electrode from the data signal lines supplied with the signal of inverted polarity can be sufficiently cancelled out, and thus the occurrence of crosstalk can be eliminated.

This prevents contrast degradation due to the disruption of the liquid crystal orientation caused by electric field disturbances from the data signal lines, as well as the occurrence of crosstalk due to the coupling capacitances between the pixel electrode and the data signal lines, even if the pixel size is reduced for higher resolution. As a result, a good liquid crystal display with high contrast can be realized.

According to the present invention, since the storage capacitance is formed beneath each data signal line, the common electrode serving as one electrode of the storage capacitance can be used as a light blocking member, which contributes to suppressing contrast degradation caused by the disruption of the liquid crystal orientation near the data line. In this case, a light blocking member conventionally formed on the counter substrate, such as a black matrix, need not be provided for the portion covered by the common electrode of the storage capacitance. Thus, the margin for alignment errors of the black matrix or the like to the pixel can be eliminated or reduced, which increases the opening ratio.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display panel having an active matrix substrate, the active matrix substrate comprising:

a substrate;

a plurality of pixel electrodes for driving a liquid crystal, the pixel electrodes being arranged in rows and columns on the substrate;

a plurality of conductive films electrically connected to the pixel electrodes, respectively;

a plurality of data signal lines for supplying data signals to pixel electrodes of a corresponding column;

a plurality of switching devices for electrically connected to each of the data signal lines to the conductive films of the corresponding column;

a plurality of scanning signal lines for controlling the switching devices to be conductive; and a plurality of storage capacitances respectively connected to terminals of the switching devices which are connected to the pixel electrodes, wherein each of the pixel electrodes overlaps one of adjacent two of the data signal lines with an insulating film interposed therebetween, corresponding one of the conductive films overlaps the other of the adjacent two of the data signal lines with the insulating film interposed therebetween, and a first coupling capacitance formed between the each of the pixel electrodes and the one of the adjacent two of the data signal lines is substantially equal to a second coupling capacitance formed between the each of the pixel electrodes and the other of the adjacent two of the data signal lines, and wherein the active matrix substrate receives the data signals in which polarities are inverted between fields or frames, and the polarities are different between the adjacent two of the data signal lines.

2. A liquid crystal panel according to claim 1, wherein each of the data signal lines includes a capacitance adjusting portion for adjusting at least either one of the first coupling capacitance and the second coupling capacitance.

3. A liquid crystal panel according to claim 1, wherein the switching devices comprise thin film transistors, and a part of each of the conductive film serves as a light blocking member covering a channel portion of the corresponding one of the thin film transistors.

4. A liquid crystal display panel according to claim 1, wherein the storage capacitances include extended portions formed below the data signal lines.

5. An active matrix substrate comprising:

a substrate;

a plurality of data signal lines formed on the substrate, the data signal lines transmitting data signals having polarities inverted between fields or frames, the polarities of the data signals being different between adjacent two of the data signal lines;

a plurality of scanning signal lines formed on the substrate to cross the data signal lines substantially at right angles;

a pixel electrode disposed in the vicinity of each of crossings of the data signal lines and the scanning signal lines;

a switching device connected to a corresponding one of the scanning signal lines for electrically connecting the pixel electrode with a corresponding one of the data signal lines; and a conductive film formed below the pixel electrode with a first insulating film interposed therebetween, the conductive film being electrically connected to the pixel electrode via a contact hole formed in the first insulating film, wherein the pixel electrode includes an overlap portion covering the corresponding one of the data signal lines, the conductive film covers another one of the data signal lines which is adjacent to the corresponding one of the data signal lines, the conductive film being insulated from the another one of the data signal lines by a second insulating film, a first coupling capacitance formed between the pixel electrode and the corresponding one of the data signal lines being substantially equal to a second coupling capacitance formed between the conductive film and the another one of the data signal lines.

6. An active matrix substrate according to claim 5, further comprising a storage capacitance connected to the switching device, electrodes of the storage capacitance being formed below the another one of the data signal lines to extend along the another one of the data signal lines.

7. An active matrix substrate according to claim 6, wherein extended portions of the electrodes of the storage capacitances serve as a light blocking member.

* * * * *